(12) United States Patent
Chiba et al.

(10) Patent No.: US 9,734,610 B2
(45) Date of Patent: Aug. 15, 2017

(54) IMAGE PROCESSING DEVICE, IMAGE PROCESSING METHOD, AND IMAGE PROCESSING PROGRAM

(71) Applicant: Rakuten, Inc., Tokyo (JP)

(72) Inventors: Naoki Chiba, Tokyo (JP); Xinhao Liu, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 42 days.

(21) Appl. No.: 14/766,166

(22) PCT Filed: Mar. 13, 2013

(86) PCT No.: PCT/JP2013/057075
§ 371 (c)(1),
(2) Date: Aug. 6, 2015

(87) PCT Pub. No.: WO2014/141412
PCT Pub. Date: Sep. 18, 2014

(65) Prior Publication Data
US 2016/0005200 A1 Jan. 7, 2016

(51) Int. Cl.
*G09G 5/02* (2006.01)
*G06T 11/60* (2006.01)
(Continued)

(52) U.S. Cl.
CPC .......... *G06T 11/60* (2013.01); *G06T 1/0007* (2013.01); *G06T 5/005* (2013.01); *G06T 5/50* (2013.01);
(Continued)

(58) Field of Classification Search
CPC ....................................................... G06T 11/60
(Continued)

(56) References Cited

U.S. PATENT DOCUMENTS 5,615,282 A * 3/1997 Spiegel ................... G06F 17/15
358/450
5,781,225 A * 7/1998 Syracuse ................. H04N 1/23
347/251
(Continued)

OTHER PUBLICATIONS

Communication issued by the International Searching Authority dated Sep. 24, 2015 in counterpart International Application No. PCT/JP2013/057075.
(Continued)

*Primary Examiner* — Javid A Amini
(74) *Attorney, Agent, or Firm* — Sughrue Mion, PLLC

(57) ABSTRACT

An image processing device according to one embodiment includes an acquisition unit, a first specifying unit, and a second specifying unit. The acquisition unit acquires an edge between a text region where the translucent text is superimposed and a background region where the translucent text is not superimposed. The first specifying unit acquires a plurality of pairs of a representative color in the text region and a representative color in the background region adjacent to each other with the edge placed therebetween, and specifies a text color and transparency of the translucent text from the plurality of pairs. The second specifying unit specifies a pixel color before the translucent text is superimposed for each pixel in the text region from a pixel color after the translucent text is superimposed, the text color and the transparency.

11 Claims, 8 Drawing Sheets

(51) Int. Cl.
  *G06T 5/50* (2006.01)
  *G06T 5/00* (2006.01)
  *G06T 1/00* (2006.01)

(52) U.S. Cl.
  CPC ............... *G06T 2207/20221* (2013.01); *G06T 2207/20224* (2013.01); *G09G 2340/12* (2013.01)

(58) Field of Classification Search
  USPC ......................................................... 345/634
  See application file for complete search history.

(56) References Cited

U.S. PATENT DOCUMENTS

| | | | | |
|---|---|---|---|---|
| 6,134,345 A * | 10/2000 | Berman | ................... | G06T 11/60 382/162 |
| 8,947,452 B1 * | 2/2015 | Ballagh | ................. | G06F 3/0486 345/420 |
| 2009/0066716 A1 * | 3/2009 | Meulen | .................... | G09G 5/14 345/589 |

OTHER PUBLICATIONS

Liu He, et al., "Object Removal by Depth-guided Inpainting", Institute for Software Technology and Interactive Systems Interactive and Multimedia Systems Group (IMS) Vienna University of Technology, Austria, 2011, total 8 pages.

* cited by examiner

IMAGE PROCESSING DEVICE, IMAGE PROCESSING METHOD, AND IMAGE PROCESSING PROGRAM

CROSS REFERENCE TO RELATED APPLICATIONS

This application is a National Stage of International Application No. PCT/JP2013/057075 filed Mar. 13, 2013, the contents of all of which are incorporated herein by reference in their entirety.

TECHNICAL FIELD

One aspect of the present invention relates to an image processing device, an image processing method, and an image processing program.

BACKGROUND ART

There is a technique that removes text from an image and complements that region by using the pixels of the surrounding background region (see Non Patent Literature 1 below). By using such a technique, it is possible to naturally restore the background hidden behind the text.

CITATION LIST

Patent Literature

NPL1: He, Liu, Michael Bleyer, and Margrit Gelautz. "Object Removal by Depth-guided Inpainting." Austrian Association for Pattern Recognition, 2011.

SUMMARY OF INVENTION

Technical Problem

When the technique of the above-described Non Patent Literature 1 is applied to an image in which a text region has transparency (translucent), the restoration of the background can be incomplete or insufficient. According to the related art, information of the background covered by text is predicted using information of the surrounding region. Thus, when a part of the background covered by translucent text is different from the surrounding region in design, that part is not restored to its original state, and a difference from the original background becomes significant. In view of the above, it is desirable to more reliably restore the background covered by translucent text.

Solution to Problem

An image processing device according to one aspect of the present invention is an image processing device for processing an image where translucent text is superimposed on an original image, including an acquisition unit configured to acquire an edge between a text region where the translucent text is superimposed and a background region where the translucent text is not superimposed, a pair acquisition unit configured to acquire a plurality of pairs of a representative color in the text region and a representative color in the background region adjacent to each other with the edge placed therebetween, a first specifying unit configured to specify a text color and transparency of the translucent text from the plurality of pairs, and a second specifying unit configured to specify a pixel color before the translucent text is superimposed for each pixel in the text region from a pixel color after the translucent text is superimposed, the text color and the transparency.

An image processing method according to one aspect of the present invention is an image processing method performed by an image processing device for processing an image where translucent text is superimposed on an original image, the method including an acquisition step of acquiring an edge between a text region where the translucent text is superimposed and a background region where the translucent text is not superimposed, a pair acquisition step of acquiring a plurality of pairs of a representative color in the text region and a representative color in the background region adjacent to each other with the edge placed therebetween, a first specifying step of specifying a text color and transparency of the translucent text from the plurality of pairs, and a second specifying step of specifying a pixel color before the translucent text is superimposed for each pixel in the text region from a pixel color after the translucent text is superimposed, the text color and the transparency.

An image processing program according to one aspect of the present invention is an image processing program causing a computer to function as an image processing device for processing an image where translucent text is superimposed on an original image, the program causing the computer to implement an acquisition unit configured to acquire an edge between a text region where the translucent text is superimposed and a background region where the translucent text is not superimposed, a pair acquisition unit configured to acquire a plurality of pairs of a representative color in the text region and a representative color in the background region adjacent to each other with the edge placed therebetween, a first specifying unit configured to specify a text color and transparency of the translucent text from the plurality of pairs, and a second specifying unit configured to specify a pixel color before the translucent text is superimposed for each pixel in the text region from a pixel color after the translucent text is superimposed, the text color and the transparency.

A computer-readable recording medium according to one aspect of the present invention is a computer-readable recording medium that stores an image processing program causing a computer to function as an image processing device for processing an image where translucent text is superimposed on an original image, the program causing the computer to implement an acquisition unit configured to acquire an edge between a text region where the translucent text is superimposed and a background region where the translucent text is not superimposed, a pair acquisition unit configured to acquire a plurality of pairs of a representative color in the text region and a representative color in the background region adjacent to each other with the edge placed therebetween, a first specifying unit configured to specify a text color and transparency of the translucent text from the plurality of pairs, and a second specifying unit configured to specify a pixel color before the translucent text is superimposed for each pixel in the text region from a pixel color after the translucent text is superimposed, the text color and the transparency.

According to the above aspects, the text color and the transparency of translucent text itself are obtained from a plurality of pairs of the representative color of the text region and the representative color of the background region. Because the pixel color of the text region is the mixture of the pixel color before text is superimposed (original background color) and the color of the text itself, if the color of the translucent text itself is determined, the pixel color of the text region can be restored to the original background color. In this manner, by obtaining the color of the translucent text itself and then specifying the pixel color before superimposition for each pixel in the text region, it is possible to more reliably restore the original background on a pixel-by-pixel basis.

In the image processing device according to another aspect, a superimposition color of each pixel in the text region where the translucent text is superimposed may be determined by a relational expression representing a relationship between the superimposition color, a color of a corresponding pixel in the original image, and the text color and the transparency of the translucent text, the pair acquisition unit may specify a first pair of a first superimposition color in the text region and a first background color in the background region adjacent to each other with the edge placed therebetween and a second pair of a second superimposition color in the text region and a second background color in the background region adjacent to each other with the edge placed therebetween, the second superimposition color being different from the first superimposition color and the second background color being different from the first background color, the first specifying unit may specify the text color and the transparency of the translucent text based on a first equation where the first pair is substituted into the relational expression and a second equation where the second pair is substituted into the relational expression, and the second specifying unit may specify a pixel value in the original image for each pixel in the text region based on the text color and the transparency of the translucent text and the relational expression.

In the image processing device according to another aspect, the first specifying unit may perform color clustering to acquire a plurality of pairs of a cluster of the text region and a cluster of the background region and acquire a representative color of each cluster to thereby acquire a plurality of pairs of a representative color in the text region and a representative color in the background region.

In the image processing device according to another aspect, the first specifying unit may acquire a pair of a cluster of the text region and a cluster of the background region when the cluster of the text region is placed between the clusters of the two background regions with the same representative color.

The image processing device according to another aspect may further include an inverse transform unit configured to obtain a range of pixel values in a small region centering on an edge of the translucent text on which anti-aliasing has been performed, and binarizes each pixel value in the small region to one of a first reference value and a second reference value.

The first reference value and the second reference value may be end points of the range of pixel values.

In the image processing device according to another aspect, the first specifying unit may acquire a rectangular region including the background region and the text region where the translucent text on which anti-aliasing has been performed is located, and acquires the representative color of each of the text region and the background region adjacent to each other with the edge in a direction along an outer edge of the rectangle region placed therebetween.

In the image processing device according to another aspect, the first specifying unit may acquire statistics of pixel values of each cluster as a representative color.

In the image processing device according to another aspect, the acquisition unit may determine that text is translucent when pixel values of a text part are dispersed.

In the image processing device according to another aspect, the acquisition unit may determine that text is translucent when there is an edge continuous from the background region to the text region.

Advantageous Effects of Invention

According to one aspect of the present invention, it is possible to more reliably restore the background covered by translucent text.

DESCRIPTION OF EMBODIMENTS

Figure 1:
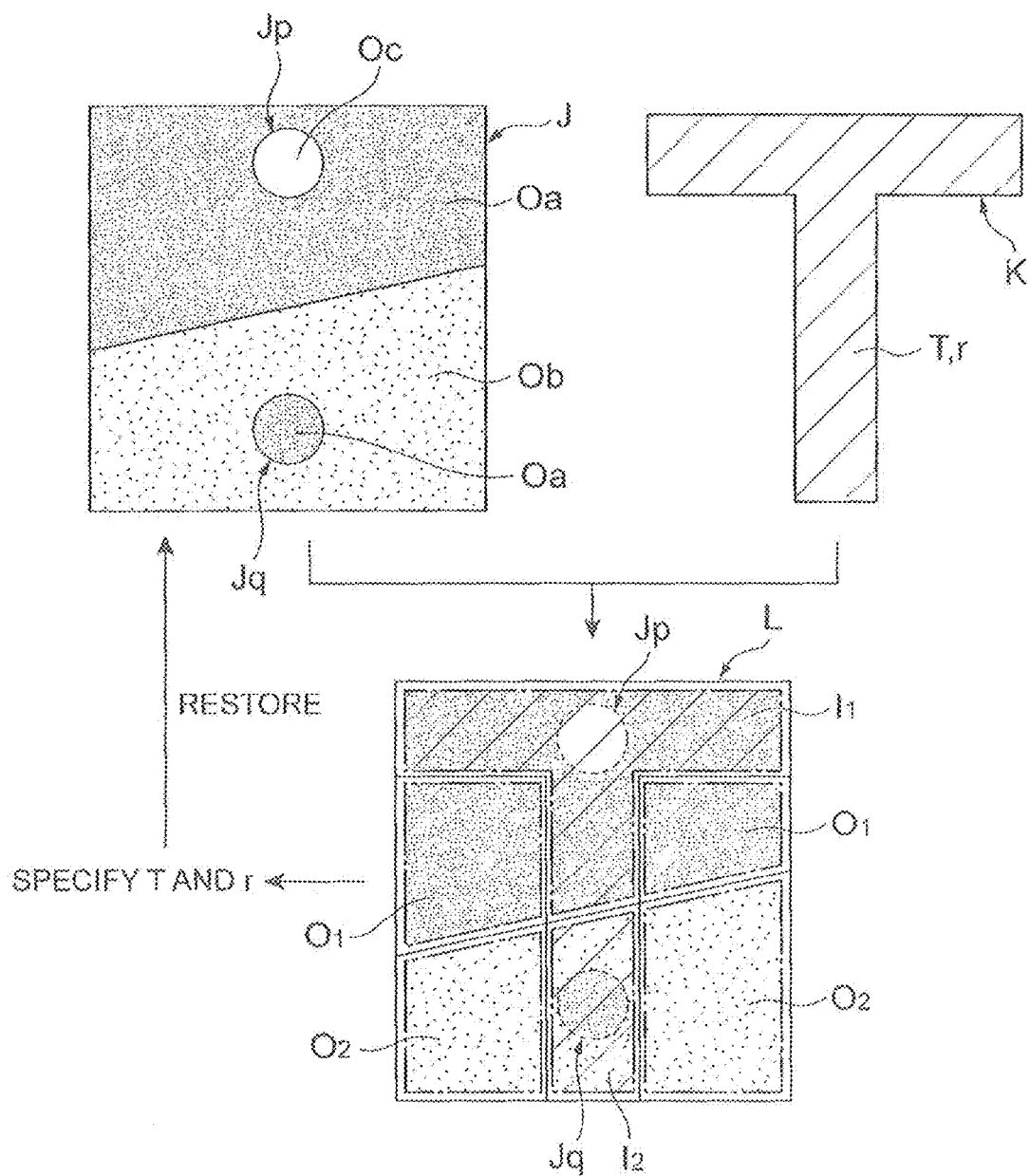
FIG. 1 is a view showing the concept of restoration processing according to an embodiment.

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an image processing device 10 according to an embodiment are described hereinafter with reference to FIGS. 1 to 4. The image processing device 10 is a computer system that removes translucent text superimposed on an original image and restores the background hidden by the translucent text. Note that "text" in this specification is the concept including a mark, a figure or the like of a certain shape. Further, "translucent text" in this specification is text having transparency. The transparency is defined as 0 to 1. When the transparency is 0, the text is solid, and when the transparency is 1, the text is completely transparent. Accordingly, in this specification, the transparency of translucent text is more than 0 and less than 1. A specific value of transparency is not particularly limited as long as it is within the above range.

The concept of restoration processing in this embodiment is described hereinafter with reference to FIGS. 1 and 2. The image processing device 10 receives input of a text image generated by superimposing translucent text on an original image. The image processing device 10 acquires a rectangular region circumscribing the text (circumscribing rectangle) from the text image and specifies the boundary (edge) between the background region and the text region in each circumscribing rectangle.

Next, the image processing device 10 specifies a region to be processed (which is referred to hereinafter as "target region"), where the background is to be restored. The target region includes a background region in which translucent text is not superimposed and a text region in which translucent text is superimposed, and it is composed of one or a plurality of circumscribing rectangles. The target region L shown in FIG. 1 is one circumscribing rectangle where the translucent text K is superimposed on the background J. In this embodiment, it is assumed that the color and transparency of translucent text itself are uniform.

Then, the image processing device 10 performs color clustering on both of the background region and the text region, and acquires a plurality of pairs of the representative color of the background region and the representative color (representative superimposition color) of the text region which are adjacent to each other with the edge placed therebetween in the target region L. In the example of FIG. 1, the image processing device 10 acquires a first pair of the representative color $O_1$ of the background region and the representative color $I_1$ of the text region and a second pair of the representative color $O_2$ of the background region and the representative color $I_2$ of the text region.

After that, the image processing device 10 specifies the text color T and the transparency r of the translucent text itself from the two pairs. The image processing device 10 then specifies and restores the original color of each pixel in the region covered by the translucent text from the color of the translucent text itself and the color of the text region. By this processing, the background J is restored. Because the restoration is performed for each pixel, the circles Jp and Jq are also restored that have been completely hidden by the translucent text K.

The restoration of the background is based on the following relational expression (1):

$$I = Or + (1-r)T \qquad (1)$$

where the variable O is the color of the background itself covered by the translucent text, and it is the color restored by the image processing device 10. The variables T and r are the text color and the transparency of the translucent text itself as described above. The variable I is the color of a pixel in the text region after the translucent text is superimposed (the apparent color in the text image). The variable I is, in other words, the mixture of the color of the background itself and the color of the translucent text itself.

Although the target region is one circumscribing rectangle in FIG. 1, the target region may include a plurality of circumscribing rectangles as described above. Note that, however, in the case of acquiring a pair of representative colors from the two circumscribing rectangles, the assumption is required that the color settings of two text letters are the same.

Figure 2:
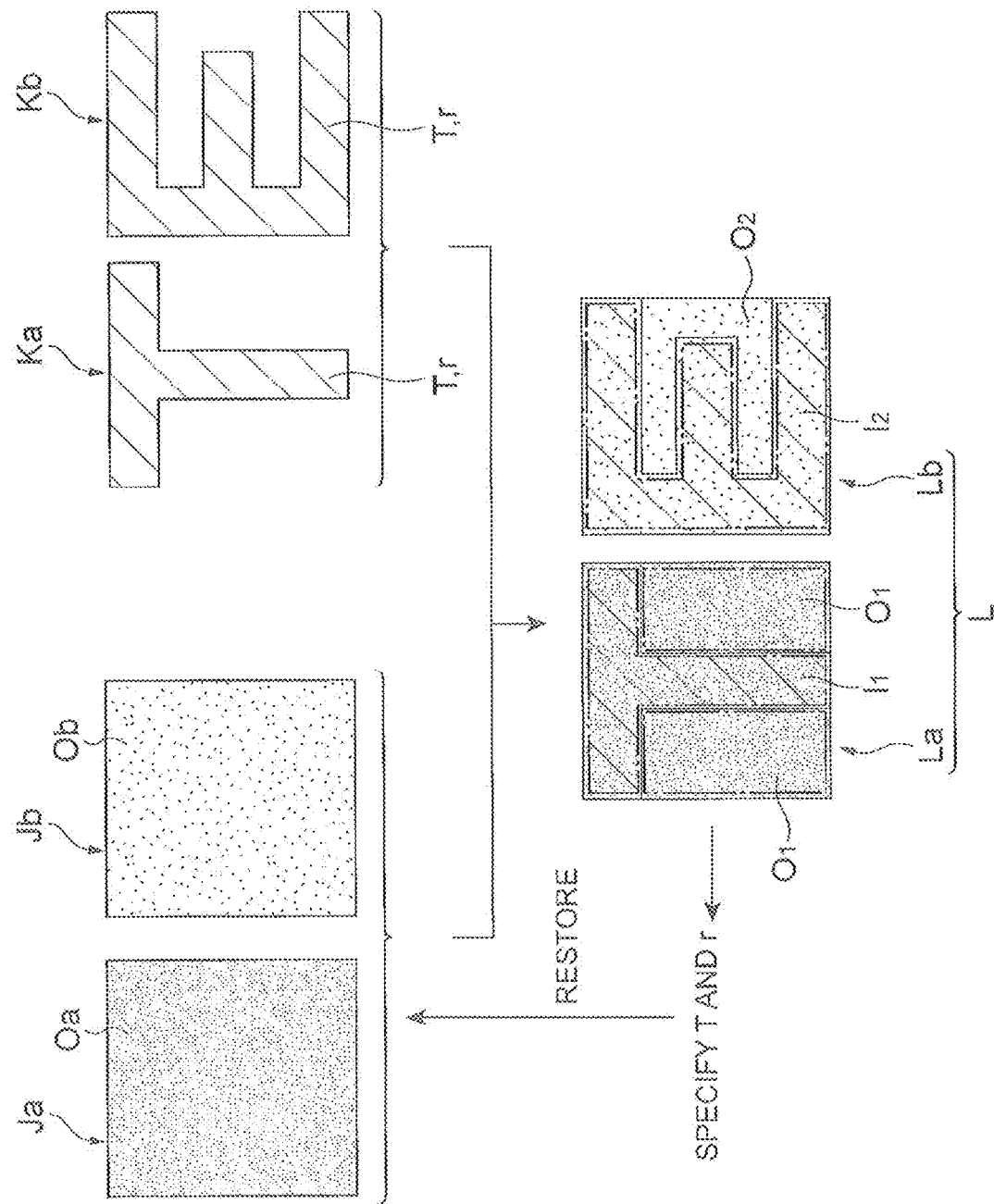
FIG. 2 is a view showing the concept of restoration processing according to the embodiment.

FIG. 2 shows an example where the target region L is composed of two circumscribing rectangles La and Lb. The circumscribing rectangle La is a region where the translucent text Ka is superimposed on the background Ja, and the circumscribing rectangle Lb is a region where the translucent text Kb is superimposed on the background Jb. In the example of FIG. 2, the image processing device 10 acquires one pair from each of the two circumscribing rectangles obtained from adjacent two text letters. Specifically, the image processing device 10 acquires a pair of the representative color $O_1$ of the background region and the representative color $I_1$ of the text region from the circumscribing rectangle La, and acquires a pair of the representative color $O_2$ of the background region and the representative color $I_2$ of the text region from the circumscribing rectangle Lb. In this case also, the image processing device 10 specifies the text color T and the transparency r of the translucent text itself from the two pairs, and restores the original color of each pixel in the text region from the color of the translucent text itself and the color of the text region. As described above, this processing is based on the assumption that the basic color and the transparency of a plurality of text letters to be processed are the same.

Note that the shape of a target region is not limited to a rectangle, and a target region may be in any shape as long as it contains a text region.

Figure 3:
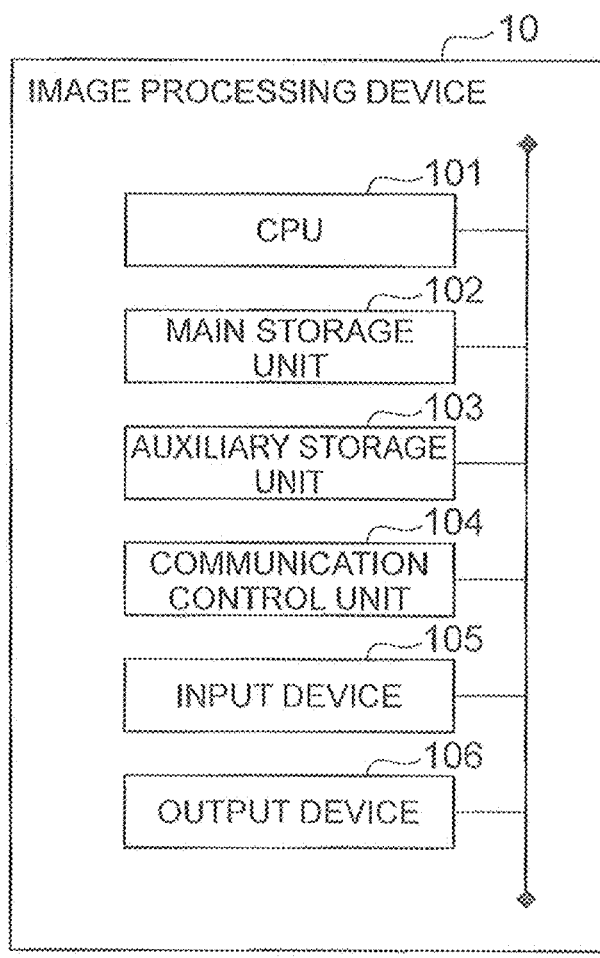
FIG. 3 is a view showing a hardware configuration of an image processing device according to the embodiment.

FIG. 3 shows a hardware configuration of the image processing device 10. The image processing device 10 includes a CPU 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display.

The functional elements of the image processing device 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Note that the image processing device 10 may be composed of one computer or may be composed of a plurality of computers.

Figure 4:
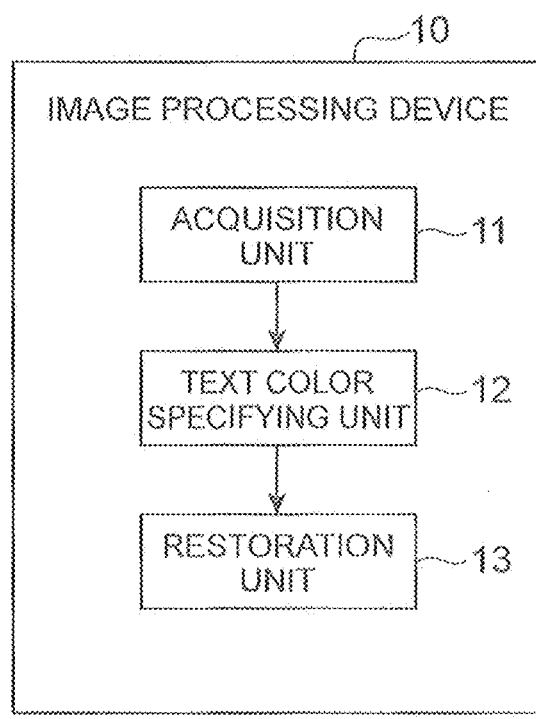
FIG. 4 is a block diagram showing a functional configuration of the image processing device according to the embodiment.

As shown in FIG. 4, the image processing device 10 includes, as functional elements, an acquisition unit 11, a text color specifying unit (pair acquisition unit, first specifying unit) 12, and a restoration unit (second specifying unit) 13.

The acquisition unit 11 is a functional element that acquires the edge between a background region and a text region. The acquisition unit 11 can acquire information of the edge of each target region by using an arbitrary method.

The acquisition unit 11 may acquire image data to which information of a target region and an edge are added from a device (not shown) other than the image processing device 10.

Alternatively, the acquisition unit 11 may perform color processing to specify a target region in image data, and further detect an edge in each target region by using the existing technique such as the Canny method.

One technique of the color processing is color clustering, which is one type of region-based approach. This technique reduces the number of colors by using the k-means method for clustering and, after clustering, divides a region for each color cluster based on topology analysis. Another technique of the color processing is classifier-based approach, such as support vector machine (SVM). Alternatively, a target region may be extracted by performing postprocessing by classifier-based approach after using region-based approach.

In this manner, there are various techniques to acquire a target region and an edge. The acquisition unit 11 outputs information of the edge of each target region to the text color specifying unit 12.

The text color specifying unit 12 is a functional element that specifies the text color and the transparency of translucent text. The "text color of translucent text" is not the apparent color but the color (basic color) that serves as a basis for the apparent color. Because the translucent text part in an image is mixed with the background, it is necessary to know the color of the translucent text itself. The text color specifying unit 12 specifies the color for each target region in the following way.

The text color specifying unit 12 acquires two pairs of the representative color of the text region and the representative color of the background region which are adjacent to each other with the edge placed therebetween as shown in FIGS. 1 and 2. The reason of acquiring the representative color of each region, not the color of each pixel, is to facilitate calculation. The text color specifying unit 12 divides each of the text region and the background region into a plurality of clusters by using color clustering and obtains the representative color of each cluster. The way of determining the representative color is not limited, and the text color specifying unit 12 may set the statistics (average, median etc.) of pixel colors in a cluster as the representative color, for example. Alternatively, the text color specifying unit 12 may use the representative color of each cluster which is input by a user. After that, the text color specifying unit 12 specifies the cluster of the text region and the cluster of the background region which are adjacent to each other with the edge placed therebetween as a pair, and obtains the representative color of each cluster in the pair. At this time, the text color specifying unit 12 acquires two pairs.

In the example of FIGS. 1 and 2, the text color specifying unit 12 acquires a pair of the representative color $I_1$ in the text region and the representative color $O_1$ in the background region and a pair of the representative color $I_2$ in the text region and the representative color $O_2$ in the background region.

Then, the text color specifying unit 12 applies information of the two pairs to the above equation (1) and thereby obtains the following simultaneous equations (2).

$$O_1 r + (1-r)T = I_1$$

$$O_2 r + (1-r)T = I_2 \quad (2)$$

After that, the text color specifying unit 12 solves the simultaneous equations (2) and thereby obtains the text color T and the transparency r of the translucent text itself. The values T and r are obtained by the following equations (3) and (4).

$$T = (I_1 - O_1 r)/(1-r) = (I_2 - O_2 r)/(1-r) \quad (3)$$

$$r = (I_1 - I_2)/(O_1 - O_2) \quad (4)$$

After obtaining the values T and r for each target region, the text color specifying unit 12 outputs information of the target region to which the values T and r for the translucent text have been added to the restoration unit 13.

The restoration unit 13 is a functional element that restores the original color of the background covered by translucent text. The restoration unit 13 performs the following processing on each target region.

When the number of pixels in the text region to be restored is N, the restoration unit 13 obtains the original color $O_{org}$ of each of the pixels $p_1$ to $p_N$ by using the above equation (1).

Specifically, the restoration unit 13 applies the color (i.e. the current pixel color) $I_c$ of the pixel $p_i$ after the translucent text is superimposed and the text color T and the transparency r of the translucent text input from the text color specifying unit 12 to the equation (1) and thereby obtains the color $O_{org}$ of the pixel $p_i$ before the translucent text is superimposed (the following equation (5)). Then, the restoration unit 13 changes the color of the pixel $p_i$ from $I_c$ to $O_{org}$.

$$I_c = O_{org} r + (1-r)T$$

Accordingly, $O_{org} = \{I_c - (1-r)T\}/r \quad (5)$

The restoration unit 13 changes the pixel color of all of the pixels $p_1$ to $p_N$ by using the above equation (5) and thereby removes the translucent text and restores the original background color.

After performing the above processing for all target regions, the restoration unit 13 outputs data of the image in which the background is restored. The way of output is not limited, and the restoration unit 13 may store the restored image data into an arbitrary storage device (not shown) or display the restored image on a monitor or print it out.

Figure 5:
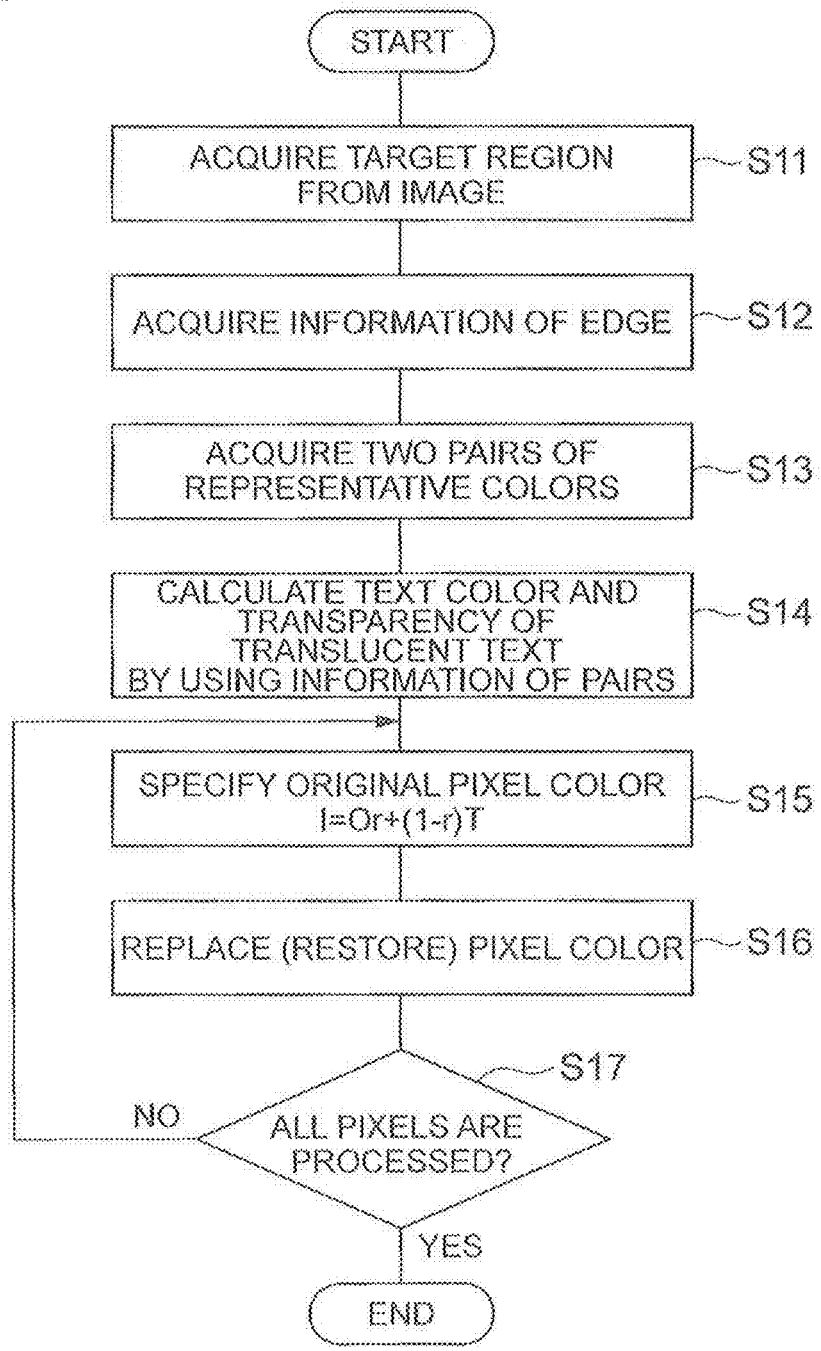
FIG. 5 is a flowchart showing an operation of the image processing device according to the embodiment.

The operation of the image processing device 10 is described, and further an image processing method according to this embodiment is described hereinafter with reference to FIG. 5. To facilitate the explanation, the processing for one target region is described hereinbelow.

First, the acquisition unit 11 acquires one target region from a text image (Step S11, acquisition step), and acquires information of an edge in the target region (Step S12, acquisition step).

Next, the text color specifying unit 12 acquires two pairs of the representative color in the text region and the representative color in the background region which are adjacent to each other with the edge placed therebetween (Step S13, pair acquisition step). The text color specifying unit 12 then substitutes information of the two pairs (two representative colors in the text region and two representative colors in the background region) to the above simultaneous equations (2) and thereby obtains the text color and the transparency of the translucent text (Step S14, first specifying step).

Then, the restoration unit 13 applies the text color and the transparency of the translucent text and the current pixel color to the above equation (1) for one pixel in the text region and thereby specifies the original pixel color (Step S15, second specifying step). After that, the restoration unit 13 replaces the current pixel color with the specified color and thereby restores the original color of the pixel (Step S16). The restoration unit 13 performs this processing for all pixels in the text region (see Step S17).

In the case where a plurality of target regions are extracted from a text image, the processing of Steps S11 to S17 is performed for each of the target regions and, in the end, image data in which the translucent text is removed and the background is restored is output.

Figure 6:
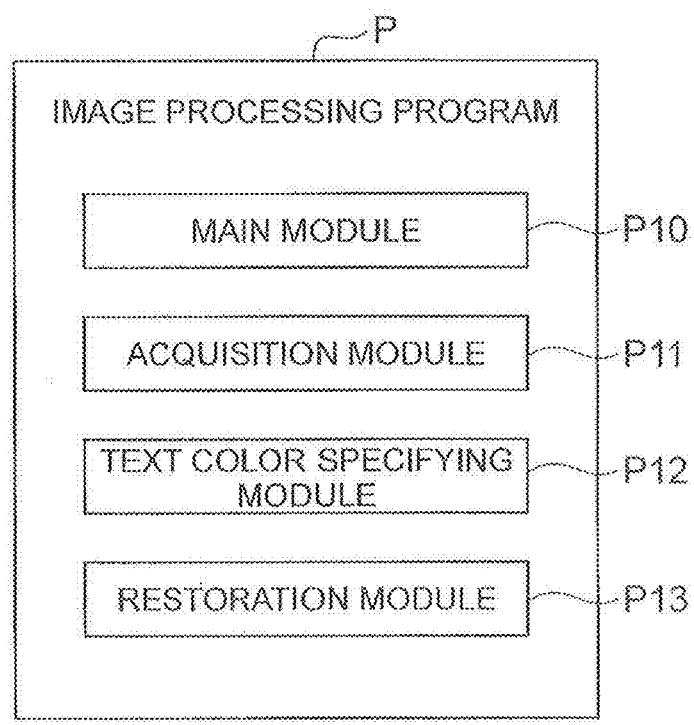
FIG. 6 is a view showing a configuration of an image processing program according to the embodiment.

An image processing program P for implementing the image processing device 10 is described hereinafter with reference to FIG. 6.

The image processing program P includes a main module P10, an acquisition module P11, a text color specifying module P12, and a restoration module P13.

The main module P10 is a part that exercises control over the image processing function. The functions implemented by executing the acquisition module P11, the text color specifying module P12 and the restoration module P13 are equal to the functions of the acquisition unit 11, the text color specifying unit 12, and the restoration unit 13 described above, respectively.

The image processing program P may be provided in the form of being recorded in a static manner on a tangible recording medium such as CD-ROM or DVD-ROM or semiconductor memory, for example. Further, the image processing program P may be provided as a data signal superimposed onto a carrier wave through a communication network.

As described above, according to this embodiment, the text color and the transparency of translucent text itself are obtained from a plurality of pairs of the representative color of the text region and the representative color of the background region. Because the pixel color of the text region is the mixture of the pixel color before text is superimposed (original background color) and the color of the text itself, if the color of the translucent text itself is determined, the pixel color of the text region can be restored to the original background color. In this manner, by obtaining the color of the translucent text itself and then specifying the pixel color before superimposition for each pixel in the text region, it is possible to more reliably restore the original background on a pixel-by-pixel basis. Because the original background can be restored on a pixel-by-pixel basis, it is possible to restore a part that is completely covered by translucent text and not continuous with the exposed background region, such as the regions Jp and Jq in FIG. 1, to the original color or the color close to that color.

An embodiment of the present invention is described in detail above. However, the present invention is not limited to the above-described embodiment. Various changes and modifications may be made to the present invention without departing from the scope of the invention.

[Use of HOG] The text color specifying unit 12 may use Histogram of Oriented Gradient (HOG) to obtain the representative color, in consideration of the case where the boundary in the background and the edge of text happen to overlap. HOG is a technique that utilizes the characteristics that, for a pair of edge pixels that form a text width, the slope of the edge of the both is the same but the orientation of each edge is opposite to each other.

Figure 7:
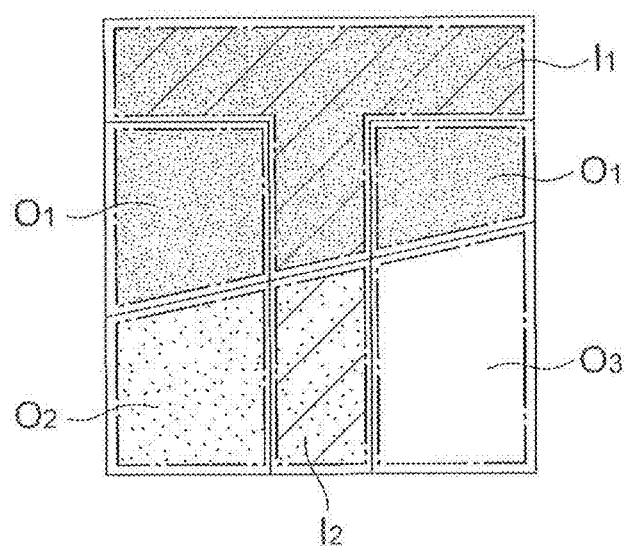
FIG. 7 is a view illustrating processing using Histogram of Oriented Gradient (HOG).

This technique is described hereinafter with reference to FIG. 7. In the example of FIG. 7, the boundary between the background region with the representative color $O_2$ and the background region with the representative color $O_3$ overlaps the edge part of the translucent text "T". Because the representative color $O_3$ is not affected by the text region at all, use of the representative color $O_3$ as a part of a pair causes an error in the result of calculation of the text color and the transparency of the translucent text itself.

To avoid this, the text color specifying unit 12 searches for a part where the cluster of a text region is placed between the clusters of two background regions with the same representative color by using HOG, and uses the representative colors of the clusters that meet this condition as a pair. In the example of FIG. 7, the cluster of the text region with the representative color $I_1$ is placed between the clusters of the two background regions with the representative color $O_1$. Thus, the text color specifying unit 12 generates a pair of the two representative colors $I_1$ and $O_1$. On the other hand, the cluster of the text region with the representative color $I_1$ is not placed between the clusters of the two background regions with the representative color $O_2$ and not placed between the clusters of the two background regions with the representative color $O_3$. Thus, the text color specifying unit 12 does not generate a pair including the representative color $I_2$. In this case, the text color specifying unit 12 needs to obtain a pair of representative colors from another circumscribing rectangle.

Figure 8:
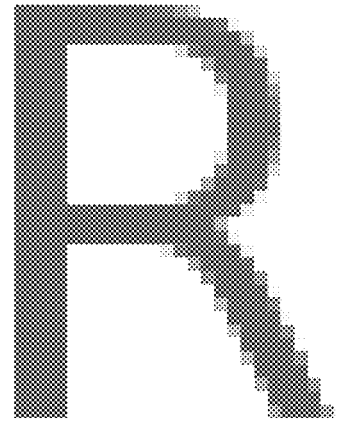
FIG. 8 is a view showing an example of anti-aliasing.

[Anti-aliasing] When translucent text is inserted, anti-aliasing that smoothes the edge of text is performed in some cases. Pixels are arranged in the horizontal direction (x-direction) and the vertical direction (y-direction), and anti-aliasing is performed for the outline (edge) of text that runs obliquely to the lines of pixels. As a result of anti-aliasing, the pixels have a color between the background color and the text color. The above equation (1) cannot be applied to the pixels on which anti-aliasing has been performed. For example, in the example of FIG. 8, this processing has been performed in the outline of substantially the right half of the text "R", and if the equation (1) is applied to this part, the accuracy of restoration decreases. Thus, in order to further enhance the accuracy of restoration, the image processing device 10 may exclude or remove the anti-alias by the following technique.

The image processing device 10 may remove the anti-alias by changing the pixels on which anti-aliasing has been performed to either one of the color of a pixel on which it is not performed in the text region or the color of a pixel in the background region adjacent to the edge.

Specifically, the image processing device 10 acquires a small region of W×W pixels centering on the pixel determined as an edge (edge pixel). Although a specific value of W is not limited, the value needs to be set to at least include the part where anti-aliasing has been applied. For example, the value may be W=3.

Next, the image processing device 10 plots the pixels in this region on a three-dimensional coordinate system indicating the RGB color space and obtains the approximate straight line that fits those pixels. The image processing device 10 can obtain the approximate straight line by using the least squares method, RANSAC (RANdom SAmple Consensus), LMedS (Least MEDian Square) and the like.

Then, the image processing device 10 projects the points indicating pixels on the straight line and specifies two pixels corresponding to the two projected points (end points) located at both ends on the straight line as reference pixels. The image processing device 10 then changes the color of the remaining pixels other than the reference pixels to either one of the colors of the two reference pixels (the first reference value and the second reference value). Specifically, when one remaining pixel is $p_r$, the image processing device 10 selects the color of the reference pixel at the shorter distance from the pixel $p_r$ as the color of the pixel $p_r$. Note that the distance between the pixel $p_r$ and the reference pixel may be the actual distance between the points plotted on the three-dimensional coordinate system or the distance between the projected points on the approximate straight line.

In this manner, the image processing device removes the anti-alias by transforming the region around the edge to binary values. This removal processing may be performed at any time before the restoration unit 13 carries out the restoration processing. For example, the removal processing may be performed before the text color specifying unit 12 selects a pair of representative colors. Thus, the removal processing may be performed by the text color specifying unit 12 or the restoration unit 13. In this case, the text color specifying unit 12 or the restoration unit 13 functions also as an inverse transform unit.

Alternatively, the text color specifying unit 12 may remove the cluster containing the pixel on which anti-aliasing has been performed when selecting the representative color of the cluster in the text region. Specifically, the text color specifying unit 12 may acquire the representative color of each of the text region and the background region adjacent to each other with the edge placed therebetween, which extends in the direction (the x-direction or y-direction) along the outer edge of the circumscribing rectangle, and generate a pair of those representative colors.

Alternatively, when the text color specifying unit 12 selects the representative color of a cluster in the text region, it may select the median or average of the pixel values contained the cluster as the representative color. Alternatively, the text color specifying unit 12 may calculate the histogram of color and select the color indicating the highest value (the color with the highest frequency of appearance) as the representative color. Because there are only few pixels on which anti-aliasing has been performed and they are exceptional, it is possible to reduce the effect of anti-aliasing by using the statistics (for example, the median, the average or the highest frequency of appearance) of pixel values in this manner.

The image processing device 10 may have the function of determining whether text is translucent or solid. In this case, the image processing device 10 (for example, the acquisition unit 11) may determine that it is translucent text when the pixel values in the text region are dispersed and determine that it is solid text when the pixel values are not dispersed. Alternatively, the image processing device 10 (for example, the acquisition unit 11) may determine that it is translucent text when there is an edge that is continuous from the background region to the text region.

REFERENCE SIGNS LIST

10 . . . image processing device, 11 . . . acquisition unit, 12 . . . text color specifying unit (pair acquisition unit, first specifying unit), 13 . . . restoration unit (second specifying unit), P . . . image processing program, P10 . . . main module, P11 . . . acquisition module, P12 . . . text color specifying module, P13 . . . restoration module

The invention claimed is:

1. An image processing device for processing an image where translucent text is superimposed on an original image, comprising:
   at least one memory operable to store computer program instructions;
   at least one processor operable to access said at least one memory, read said program instructions, and operate according to said program instructions, said program instructions including:
   acquisition instructions configured to cause at least one of said at least one processor to acquire an edge between a text region where the translucent text is superimposed and a background region where the translucent text is not superimposed;
   pair acquisition instructions configured to cause at least one of said at least one processor to acquire a first pair of a first superimposition color in the text region and a first background color in the background region adjacent to each other with the edge placed therebetween and a second pair of a second superimposition color in the text region and a second background color in the background region adjacent to each other with the edge placed therebetween, the second superimposition color being different from the first superimposition color and the second background color being different from the first background color;
   first specifying instructions configured to cause at least one of said at least one processor to specify a text color and transparency of the translucent text by using the first pair and the second pair; and
   second specifying instructions configured to cause at least one of said at least one processor to specify a pixel color before the translucent text is superimposed for each pixel in the text region from a pixel color after the translucent text is superimposed, the text color and the transparency.

2. The image processing device according to claim 1, wherein
   a superimposition color of each pixel in the text region where the translucent text is superimposed is determined by a relational expression representing a relationship between the superimposition color, a color of a corresponding pixel in the original image, and the text color and the transparency of the translucent text, and
   the first specifying instructions are further configured to cause at least one of said at least one processor to specify the text color and the transparency of the translucent text based on a first equation where the first pair is substituted into the relational expression and a second equation where the second pair is substituted into the relational expression, and
   the second specifying instructions configured to cause at least one of said at least one processor to specify a pixel value in the original image for each pixel in the text region based on the text color and the transparency of the translucent text and the relational expression.

3. The image processing device according to claim 1, wherein
   the first specifying instructions are further configured to cause at least one of said at least one processor to perform color clustering to acquire a plurality of pairs of a cluster of the text region and a cluster of the background region and acquire a representative color of each cluster to thereby acquire a plurality of pairs of a representative color in the text region and a representative color in the background region.

4. The image processing device according to claim 3, wherein
   the first specifying instructions are further configured to cause at least one of said at least one processor to acquire a pair of a cluster of the text region and a cluster of the background region when the cluster of the text region is placed between the clusters of the two background regions with the same representative color.

5. The image processing device according to claim 1, further comprising:
   inverse transform instructions configured to cause at least one of said at least one processor to obtain a range of pixel values in a small region centering on an edge of the translucent text on which anti-aliasing has been performed, and binarize each pixel value in the small region to one of a first reference value and a second reference value, wherein
   the first reference value and the second reference value are end points of the range of pixel values.

6. The image processing device according to claim 1, wherein
   the first specifying instructions are further configured to cause at least one of said at least one processor to acquire a rectangular region including the background region and the text region where the translucent text on which anti-aliasing has been performed is located, and acquire the representative color of each of the text region and the background region adjacent to each other with the edge in a direction along an outer edge of the rectangle region placed therebetween.

7. The image processing device according to claim 3, wherein
   the first specifying instructions are further configured to cause at least one of said at least one processor to acquire statistics of pixel values of each cluster as a representative color.

8. The image processing device according to claim 1, wherein
the acquisition instructions are further configured to cause at least one of said at least one processor to determine that text is translucent when pixel values of a text part are dispersed.

9. The image processing device according to claim 1, wherein
the acquisition instructions are further configured to cause at least one of said at least one processor to determine that text is translucent when there is an edge continuous from the background region to the text region.

10. An image processing method performed by at least one processor in an image processing device for processing an image where translucent text is superimposed on an original image, the method comprising:
acquiring an edge between a text region where the translucent text is superimposed and a background region where the translucent text is not superimposed;
acquiring a first pair of a first superimposition color in the text region and a first background color in the background region adjacent to each other with the edge placed therebetween and a second pair of a second superimposition color in the text region and a second background color in the background region adjacent to each other with the edge placed therebetween, the second superimposition color being different from the first superimposition color and the second background color being different from the first background color;
specifying a text color and transparency of the translucent text by using the first pair and the second pair; and
specifying a pixel color before the translucent text is superimposed for each pixel in the text region from a pixel color after the translucent text is superimposed, the text color and the transparency.

11. A non-transitory computer-readable recording medium storing an image processing program causing a computer to function as an image processing device for processing an image where translucent text is superimposed on an original image, the program causing the computer to:
acquire an edge between a text region where the translucent text is superimposed and a background region where the translucent text is not superimposed;
acquire a first pair of a first superimposition color in the text region and a first background color in the background region adjacent to each other with the edge placed therebetween and a second pair of a second superimposition color in the text region and a second background color in the background region adjacent to each other with the edge placed therebetween, the second superimposition color being different from the first superimposition color and the second background color being different from the first background color;
specify a text color and transparency of the translucent text by using the first pair and the second pair; and
specify a pixel color before the translucent text is superimposed for each pixel in the text region from a pixel color after the translucent text is superimposed, the text color and the transparency.

\* \* \* \* \*